US008504359B2

(12) United States Patent
Yun et al.

(10) Patent No.: US 8,504,359 B2
(45) Date of Patent: Aug. 6, 2013

(54) METHOD AND APPARATUS FOR SPEECH RECOGNITION USING DOMAIN ONTOLOGY

(75) Inventors: Seung Yun, Daejeon (KR); Soo Jong Lee, Daejeon (KR); Jeong Se Kim, Daejeon (KR); Il Bin Lee, Daejeon (KR); Jun Park, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 636 days.

(21) Appl. No.: 12/551,812

(22) Filed: Sep. 1, 2009

(65) Prior Publication Data
US 2010/0145680 A1    Jun. 10, 2010

(30) Foreign Application Priority Data
Dec. 10, 2008  (KR) ......................... 10-2008-0125524

(51) Int. Cl.
*G10L 15/00*    (2006.01)
(52) U.S. Cl.
USPC ............. 704/231; 704/235; 704/251; 704/10; 704/255; 704/257

(58) Field of Classification Search
USPC .................. 704/10, 231, 251, 235, 255, 257
See application file for complete search history.

(56) References Cited

U.S. PATENT DOCUMENTS

| 7,383,172 | B1 * | 6/2008 | Jamieson .......................... 704/9 |
| 2004/0220809 | A1 * | 11/2004 | Wang et al. .................... 704/257 |
| 2007/0100618 | A1 * | 5/2007 | Lee et al. ....................... 704/238 |
| 2007/0118353 | A1 * | 5/2007 | Cho et al. .......................... 704/3 |

FOREIGN PATENT DOCUMENTS

| KR | 1998-076309 | 11/1998 |
| KR | 10-2007-0049416 | 5/2007 |
| KR | 10-2008-0028659 | 4/2008 |

* cited by examiner

*Primary Examiner* — Qi Han
(74) *Attorney, Agent, or Firm* — Staas & Halsey LLP

(57) ABSTRACT

A speech recognition method using a domain ontology includes: constructing domain ontology DB; forming a speech recognition grammar using the formed domain ontology DB; extracting a feature vector from a speech signal; modeling the speech signal using an acoustic model. The method performs speech recognition by using the acoustic model, the speech recognition dictionary and the speech recognition grammar on the basis of the feature vector.

14 Claims, 5 Drawing Sheets

METHOD AND APPARATUS FOR SPEECH RECOGNITION USING DOMAIN ONTOLOGY

CROSS-REFERENCE TO RELATED APPLICATION

The present invention claims priority of Korean Patent Application No. 10-2008-0125524, filed on Dec. 10, 2008, which is incorporated herein by reference.

FIELD OF THE INVENTION

The present invention relates to a method and apparatus for speech recognition using a domain ontology, and, more particularly, to a method and apparatus capable of creating Context Free Grammar (hereinafter referred to as "CFG")-type speech recognition grammar using a domain ontology configured on the basis of a corpus and recognizing speech using the created speech recognition grammar.

BACKGROUND OF THE INVENTION

As is well known, connected word speech recognition technology or continuous speech recognition technology may require a language model, as its component, to find the connection between words forming a sentence. Such language models used may be basically classified into two types: statistical language models based on large-sized corpora such as N-gram models and grammar-based language models represented by CFG.

The statistical language model requires a large-sized corpus, so that it is used for the cases where large-sized corpora can be obtained, such as dictation systems, broadcast news recognition, and lecture and public speaking recognition. Although this model has the advantage of being capable of recognizing relatively various sentences, it always has a possibility of erroneous word connection because a statistical modeling methodology itself is configured to represent the connection between words using probability and it is impossible to accurately ascertain the probability.

Therefore, the grammar-based language model is adopted in those fields which require high accuracy and in which the patterns of human utterances are relatively simple. In detail, the grammar-based language model is mainly adopted for interactive speech interface systems such as robots, home networks and interactive TV guides, or automatic interpretation systems used in specific fields such as the military and tourism. Meanwhile, in the case of the grammar-based language model, the grammar is prepared by an expert or automatically acquired through a corpus. In both cases, as the number of words to be recognized increases and sentences to be recognized become more complicated, sentences with non-viable meanings inevitably occur. For example, an example of domain-specific CFG-type speech recognition grammar written to recognize a sentence such as "eat an apple" may be described in Extended Backus-Naur Form (EBNF), as shown in the following Table 1:

TABLE 1

<eat> ::= eat | would like to eat | will eat;
<article> ::= an | a | the;
<fruits> ::= apple | pear | grapes | banana;
<sentence> ::= <eat>[<article>]<fruits>;

The above-described conventional sentence has no problem in the above situation. However, if a rule such as "<pare>::=please pare|would you pare" is added to the existing grammar to additionally recognize a sentence such as "please pare an apple," the sentence "please pare an apple" is normally recognized. However sentences, such as "please pare grapes" or "please pare a banana," which cannot be created in the light of meaning are allowed, and thus the possibility of erroneous recognition increases. Accordingly, a grammar system allowing sentences which are not uttered by humans can be created. Further, a search area used in a speech recognition process is unnecessarily increased, so that there are disadvantages as concerns memory and speed.

SUMMARY OF THE INVENTION

Therefore, the present invention provides a method and apparatus for recognizing speech using a domain ontology which is configured for a speech recognition target domain, creates speech recognition grammar to which the domain ontology has been applied, and recognizes speech using the created speech recognition grammar.

In accordance with an aspect of the present invention, there is provided a speech recognition method using a domain ontology including: constructing domain ontology DB; forming a speech recognition grammar using the constructed domain ontology DB; extracting a feature vector from a speech signal; modeling the speech signal by using an acoustic model; and recognizing speech by using the acoustic model, the speech recognition dictionary and the speech recognition grammar on the basis of the feature vector.

In accordance with another aspect of the present invention, there is provided a speech recognition apparatus using a domain ontology including: a domain ontology unit for constructing domain ontology DB; a grammar forming unit for forming a speech recognition grammar using the formed domain ontology DB; an vector extracting unit for extracting a feature vector from a speech signal; a model unit for modeling the speech signal using an acoustic model; and a speech recognizing unit for recognizing speech using the acoustic model, the speech recognition dictionary and the speech recognition grammar on the basis of the feature vector.

The present invention includes: configuring a domain ontology for a speech recognition target domain, creating speech recognition grammar to which the constructed domain ontology has been applied, and recognizing speech using the created speech recognition grammar, thereby improving the performance of a speech recognition apparatus.

Further, the present invention includes creating grammar to express only sentences with viable meanings, so that the possibility of erroneous recognition decreases, thereby increasing the accuracy of speech recognition.

Furthermore, although the range of extensibility of a grammar to which has been applied the domain ontology is the same as that of the conventional method, the present invention creates only sentences with viable meanings, whereas the conventional grammar allows for sentences which are grammatically correct but which cannot be created because of meaning problems, such as 'please pare a banana', thereby efficiently performing speech recognition.

Moreover, compared to the conventional grammar-based speech recognition apparatus, the present invention accommodates only sentences with viable meanings, so that the total number of sentences that can be recognized decreases, with the result that the search area of a speech recognition process is reduced, thereby increasing speech recognition speed and occupying a small amount of memory.

BRIEF DESCRIPTION OF THE DRAWINGS

The objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
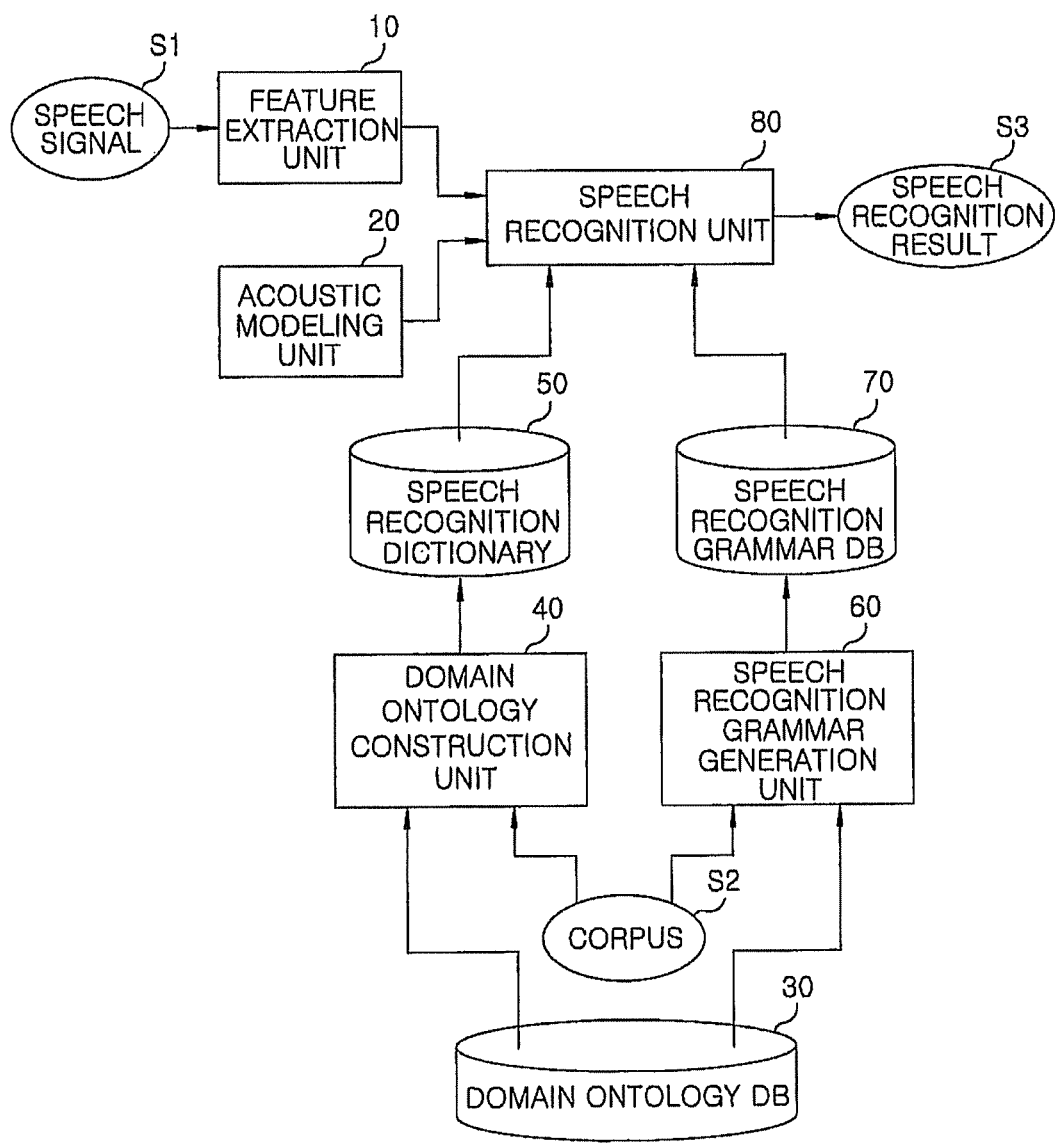
FIG. 1 is a block diagram showing an apparatus for recognizing speech using a domain ontology in accordance with an embodiment of the present invention.

FIG. 1 is a block diagram showing an apparatus for recognizing speech using a domain ontology in accordance with an embodiment of the present invention. The apparatus for recognizing speech using a domain ontology includes a feature extraction unit 10, an acoustic modeling unit 20, a domain ontology DataBase (hereinafter referred to as the "DB") 30, a domain ontology construction unit 40, a speech recognition dictionary DB 50, a speech recognition grammar generation unit 60, a speech recognition grammar DB 70, and a speech recognition unit 80.

A speech signal S1 is provided through a microphone (not shown) to the apparatus. In the apparatus, the feature extraction unit 10 extracts a frame-based feature vector from the speech signal S1, and provides it to the speech recognition unit 80.

The acoustic modeling unit 20 models features of the speech signal S1 to perform similarity measurement and speech recognition, and provide a comparable acoustic model for the speech signal S1 to the speech recognition unit 80.

The domain ontology DB 30 stores classes of nouns, attributes for the nouns which are specified by predicates and modifiers that are defined.

Figure 2:
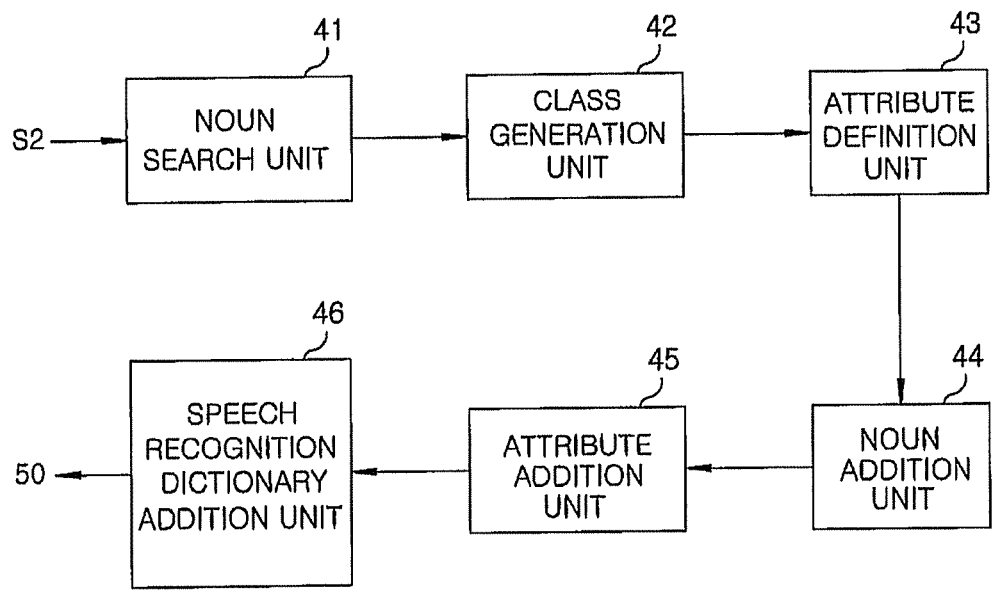
FIG. 2 is a detailed block diagram showing the domain ontology construction unit of FIG. 1.

The domain ontology construction unit 40, as illustrated in a detailed block diagram shown in FIG. 2, includes a noun search unit 41, a class generation unit 42, an attribute definition unit 43, a noun addition unit 44, an attribute addition unit 45, and a speech recognition dictionary addition unit 46.

The noun searching unit 41 searches a noun, i.e., an instance in each sentence input from a corpus S2 up to the last sentence. If a noun is found in a sentence input from the corpus S2, noun presence information indicating the presence of the noun in the sentence is provided to the instance class generation unit 42.

The class generation unit 42 checks whether a class, to which the noun, i.e., the instance, present in the sentence input from the corpus S2 belongs, has been previously defined in the domain ontology DB 30 on the basis of the noun presence information input from the noun searching unit 41. If the class has not been previously defined, the class to which the instance belongs is defined to be stored in the domain ontology DB 30 and the sentence input from the corpus S2 is provided to the attribute definition unit 43.

The attribute definition unit 43 defines an attribute of the noun by using the predicate and/or the modifier present in the sentence, when it/they present(s) the feature of the noun. At this time, the attribute definition unit 43 checks whether an attribute is already defined in the domain ontology DB 30, and, if the attribute has not been previously defined, the argument structure attribute is defined and stored into the domain ontology DB 30.

The noun addition unit 44 adds nouns, (i.e., instances) which have not been stored in the domain ontology DB 30 because they have not appeared in the corpus S2, to related classes.

After the nouns (the instances) are added to the corresponding classes by the noun addition unit 44, attributes for the instances defined in each class are newly added in the attribute addition unit 45.

The speech recognition dictionary addition unit 46 adds words presented in the sentences input from the corpus S2 to the speech recognition dictionary DB 50 through phoneme conversion.

Figure 3:
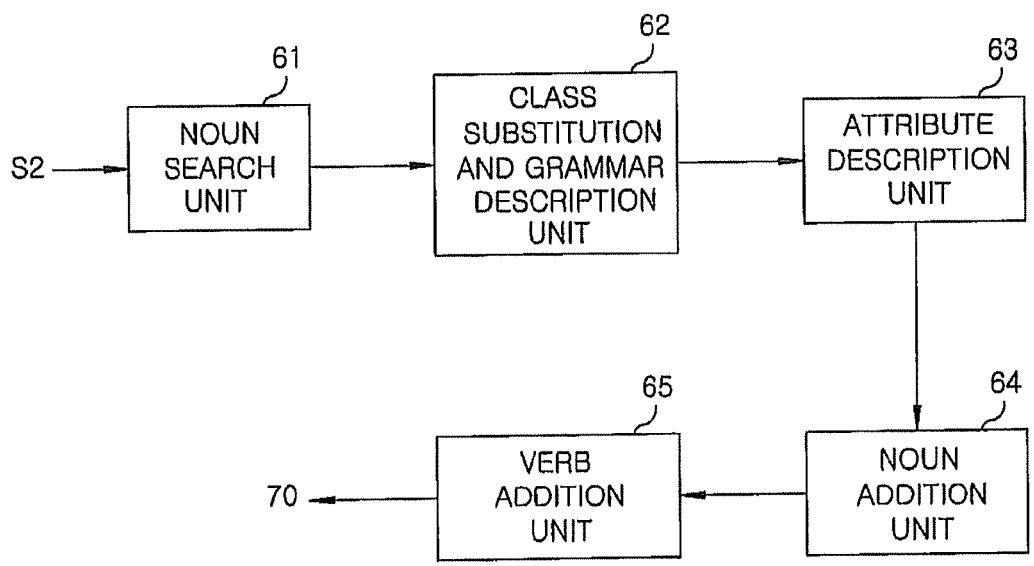
FIG. 3 is a detailed block diagram showing the speech recognition grammar generation unit of FIG. 1.

The speech recognition grammar generation unit 60, as illustrated in FIG. 3, includes a noun search unit 61, a class substitution and grammar description unit 62, an attribute describing unit 63, a noun addition unit 64 and a verb addition unit 65.

The noun search unit 61 searches a noun, i.e., an instance in each sentence input from a corpus S2 up to the last sentence, and if a noun is found in a sentence input from the corpus S2, the sentence is provided to the attribute determination unit 62.

The class substitution and grammar description unit 62 substitutes the noun in the sentence input from the corpus S2 to its corresponding class c1 and describe it in the speech recognition grammar DB 70 to form a speech recognition grammar.

The attribute describing unit 63 presents attributes of the noun presence in the sentence input from the class substitution and grammar description unit 62. That is, a predicate or/and a modifier presenting the features in the sentence is/are directly described with a class in a class name field or described in the speech recognition grammar DB 70. Then, the attribute presenting unit 62 sends the sentence to the instance describing unit 63.

Then, the noun addition unit 64 searches instances having the attributes presented in the attribute describing unit 63 in the class c1. The searched instances are described in the speech recognition grammar in the speech recognition grammar DB 70.

The verb phrase addition unit 65 adds verbs, which are input from the corpus S2 up to the last sentence therein, in the speech recognition grammar in speech recognition grammar DB 70. Synonyms of the verb in the existing sentence or verbs having similar meaning thereto are added without losing meaning by considering the tense, aspect and mode.

The speech recognition unit 80 the speech recognition using the acoustic model input from the acoustic modeling unit 20, the speech recognition dictionary stored in the speech recognition dictionary DB 50 and configured such that the domain ontology has been applied thereto, and the speech recognition grammar stored in the speech recognition grammar DB 70 and configured such that the domain ontology has been applied thereto, on the basis of the frame-based feature vector from the feature extraction unit 10.

Accordingly, the present invention is configured to construct a domain ontology for a speech recognition target domain, create speech recognition grammar to which the constructed domain ontology has been applied, and recognize speech using the speech recognition grammar, thereby increasing the performance of a speech recognition apparatus. Furthermore, the present invention is configured to create grammar so as to express only sentences with viable meanings, so that the possibility of erroneous recognition decreases, thereby increasing the accuracy of speech recognition.

Next, a process of recognizing speech by using the domain ontology in accordance with the embodiment of the present embodiment having the above-described configuration will be described in detail below.

Figure 4:
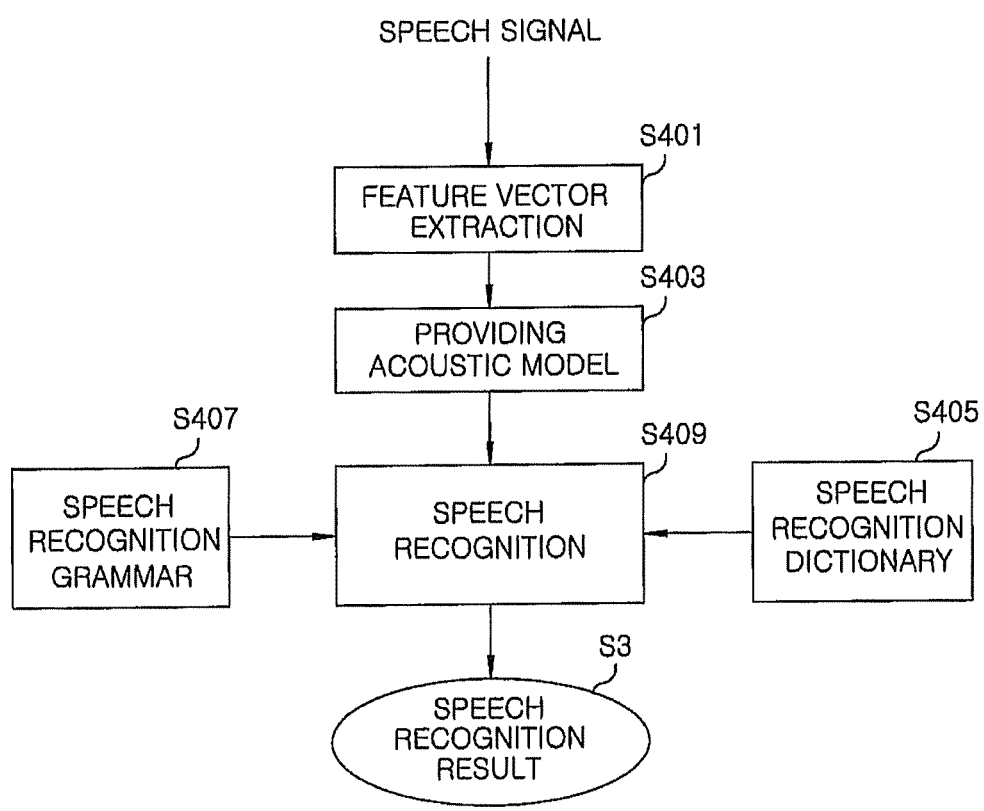
FIG. 4 is a flowchart sequentially showing a method of recognizing speech using a domain ontology in accordance with the embodiment of the present invention.

FIG. 4 is a flowchart sequentially showing a method of recognizing speech using the domain ontology in accordance with the present invention.

First, when a speech signal S1 is input through a microphone (not shown), the feature extraction unit 10 extracts a frame-based feature vector from the input speech signal S1 at step S401, and provides it to the speech recognition unit 80.

Thereafter, the acoustic modeling unit 20 models the signal feature of the speech signal S1 to perform similarity measurement and recognition, and provides a comparable acoustic model to the speech recognition unit 80 at step S403.

Then, the speech recognition unit 80 performs speech recognition at step S409 by using the acoustic model input from the acoustic modeling unit 20, the speech recognition dictionary in the speech recognition dictionary DB 50 configured by applying the domain ontology thereto (S405), and the speech recognition grammar in the speech recognition grammar DB 70 configured by applying the domain ontology thereto (S407), based on the frame-based feature vector input from the feature extraction unit 10, and then outputs speech recognition results S3.

Figure 5:
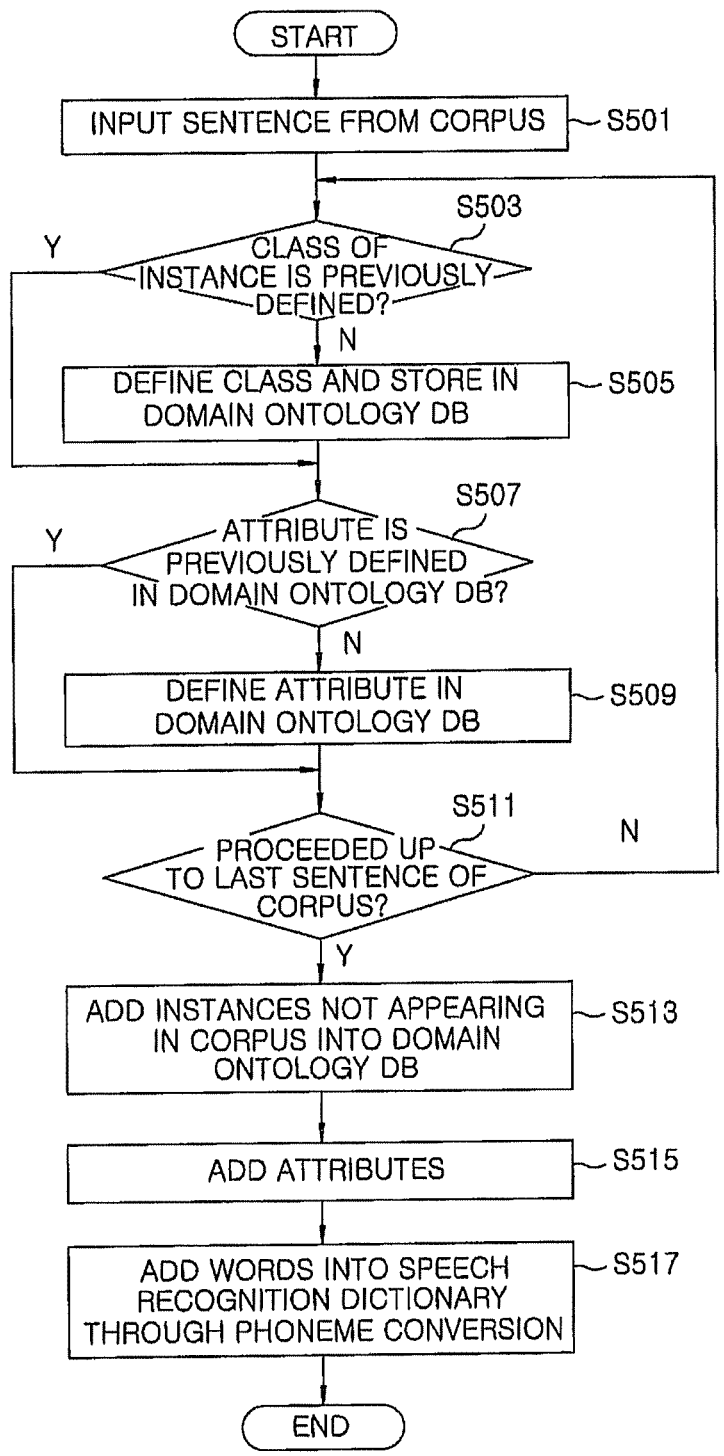
FIG. 5 is a detailed flowchart showing a method of constructing a speech recognition dictionary to which the domain ontology has been applied in a speech recognition dictionary DB in accordance with the embodiment of the present invention.

FIG. 5 is a detailed flowchart showing a method of constructing a speech recognition dictionary to which the domain ontology has been applied in the speech recognition dictionary DB 50 in accordance with the embodiment of the present invention.

First, when a sentence, e.g., "pare a red apple" is input from the corpus S2 at step S501, the noun search unit 41 in the domain ontology construction unit 40 finds a noun in the sentence. If a noun, i.e., "apple" is found, the noun search unit 41 provides noun presence information indicating the presence of the noun in the sentence to the class generation unit 42.

Then, the class generation unit 42 checks whether a class to which the corresponding instance (apple) belongs has been previously defined in the domain ontology DB 30 at step S503. In this case, if the class has not been previously defined, the instance, i.e., apple, is classified as the class "fruits" and stored in the domain ontology DB 30 at step S505. Then the class generation unit 42 provides the sentence input from the corpus S2 to the attribute definition unit 43.

The attribute definition unit 43 defines "red" and "pare" presenting the features of the apple as attributes thereof. At this time, the attribute definition unit 43 checks whether the attribute "red" and "pare" have been previously defined in the domain ontology DB 30 at step S507, and, if they have not been previously defined, they are stored in the domain ontology DB 30 at step S509. Here, classification is performed on all nouns, but the assignment of an attribute to a predicate or a modifier is not always performed. For example, in the case of the sentence "give a delicious apple", the task of defining "apple" as an instance of the class "fruits" is performed. However, in the case of predicates, "give" is not assigned an attribute because delivery is not merely the feature of an apple, and "delicious" is not also assigned an attribute because "delicious" is not merely the feature of an apple. In this case, it may be possible to define such an attribute only when the attribute has not been previously defined.

When the construction of class and attribute definition has been performed up to the last sentence of the corpus S2 at step S511, the noun addition unit 45 adds nouns, i.e., instances, which have not been stored into the domain ontology DB 30 because they do not appear in the corpus S2 at step S513. That is, since the names of all fruits may not appear in the corpus S2, fruit instances are added to the class, in addition to fruit names defined as the instances of the class.

Next, for each of the nouns, i.e., instances, attributes which belong to attributes defined for the corresponding class, which have not been previously defined in the ontology DB 30 are added by the attribute addition unit 46 at step S515. That is, when "pare", "peel", "red", "yellow", "sour", "sweet" and "astringent" have been found in the corpus S2 as attributes that needs to be defined for the class "fruits", attributes are added for corresponding fruits. In particular, "apple" has the attributes "pare", "red", "sour" and "sweet", while "banana" has the attributes "peel", "yellow", "sweet" and "astringent".

The values of such attributes may be represented simply using the signs plus (+) and minus (−), or using various steps or specific values.

Finally, the domain ontology DB 30 is finally configured by adding the corresponding words to the speech recognition dictionary DB 50 using the speech recognition dictionary addition unit 47 through a phoneme conversion process at step S517.

Figure 6:
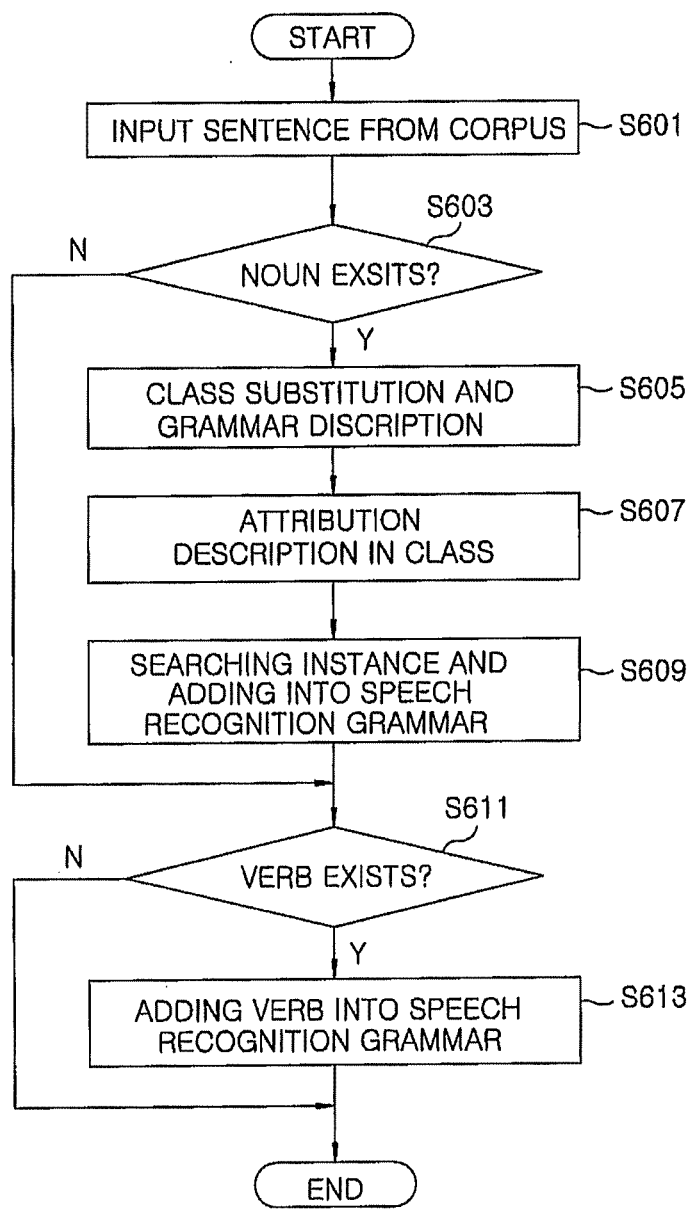
FIG. 6 is a detailed flowchart showing a method of writing speech recognition grammar to which the domain ontology has been applied in a speech recognition grammar DB in accordance with the embodiment of the present invention.

FIG. 6 is a detailed flowchart showing a method of writing speech recognition grammar to which the domain ontology is applied in the speech recognition grammar DB 70 in accordance with the embodiment of the present invention.

First, when a sentence, e.g., "pare an apple" is input from the corpus S2 at step S601, the noun search unit 61 in the speech recognition grammar generation unit 60 searches whether a noun, i.e., an instance, exists in the sentence at step S603. In this example, the noun search unit 61 finds "apple" in the above sentence and send the sentence to the class substitution and grammar description unit 62.

At step S605, the class substitution and grammar description unit 62 substitutes the class "fruits" to which the corresponding instance belongs in the case of the corresponding noun, i.e., "apple", in the sentence input from the noun search unit 61, describes in the speech recognition grammar DB 70 to form the speech recognition grammar at step S603, and then provides the sentence to the attribute describing unit 63.

The attribute describing unit 63 describes attributes of the instance (apple) which is present in the sentence input from the class substitution and grammar description unit 62 in the class, at step S607. In this example, "pare" becomes the attribute of the "apple" so that the "pare" (attribute) can be described with the "fruits" (class) in a class name field as "fruits-pare", as shown in Table 2. Further, the attribute may be described in the speech recognition grammar in the speech recognition grammar DB 70 As a different example, if a sentence "pare a red apple" is input from the corpus S2 at step S601, an attribute "red" is also present as well as "pare". Therefore, the attributes are described as "fruits-pare-red" in the in the speech recognition grammar in the speech recognition grammar DB 70 as presented in Table 2.

TABLE 2

```
<fruits-pare> ::= pear | apple | melon | persimmon;
<fruits-pare-red> ::= persimmon | apple;
<article> ::= a | an | the;
<red> ::= red | purple;
<pare> ::= [please] pare | would you [please] pare;
<sentence> ::= <pare> [<article>] <fruits-pare> | <pare>
   [<article>] <red> <fruits-pare-red>;
```

Further, the noun addition unit 64 searches instances having the attributes presented in the attribute describing unit 63 in the class. In this example, all instances having attribute "pare" in the class "fruits", are searched and then added into the speech recognition grammar of the speech recognition grammar DB 70 at step S609. That is, referring to Table 2, the existing domain ontology DB 30 is searched, and then "pear", "apple", "melon" and "persimmon" satisfying the attribute "pare" are included as instances of the class.

After adding the instances by the noun addition unit 64 searches a verb in the sentence input from the corpus S2 at step 611 and if a verb exists, it is added into the speech recognition grammar of the speech recognition grammar DB 70 at step S613. At this time, verbs having similar meanings to the verb in the existing sentence or synonyms thereof are added without losing meaning by considering the tense, aspect and mode. In this example, "would you please pare" can be added in the speech recognition grammar, in addition to the existing verb "please pare"

As described above, although the range of the extensibility of the grammar of the present invention to which the domain ontology has been applied is the same as that of the conventional method, the present invention is configured to generate only sentences with viable meanings, whereas the conventional grammar allows for sentences which are grammatically correct but which cannot be generated because of meaning problems, such as "please pare a banana", thereby being capable of efficiently performing speech recognition. Further, compared to the conventional grammar-based speech recognition apparatus, the present invention is configured to accommodate only sentences with viable meanings, so that the total number of sentences that can be recognized decreases, with the result that the search area of a speech recognition process is reduced, thereby increasing speech recognition speed and occupying a, small amount of memory.

While the invention has been shown and described with respect to the preferred embodiments, it will be understood by those skilled in the art that various changes and modifications may be made without departing from the spirit and scope of the invention as defined in the following claims.

What is claimed is:

1. A speech recognition method using a domain ontology, comprising:
   constructing domain ontology DB;
   forming a speech recognition grammar using the constructed domain ontology DB so that the speech recognition grammar generates only sentences with viable meanings;
   extracting, by a computer, a feature vector from a speech signal;
   modeling the speech signal by using an acoustic model; and
   recognizing speech by using the acoustic model and the speech recognition grammar on the basis of the feature vector,
   wherein constructing the domain ontology DB includes adding attribute(s) for nouns, in sentences input from a corpus, which are not defined in the class into the domain ontology DB, and
   the attribute(s) is a predicate and/or modifier presenting features of each of the nouns so that the domain ontology DB includes only sentences with viable meanings.

2. The speech recognition method of claim 1, wherein said constructing domain ontology DB includes:
   searching nouns in sentences input from the corpus and;
   forming a class, to which each of the nouns searched in said searching nouns belongs, in the domain ontology DB;
   defining attributes of each of the nouns;
   adding nouns, which do not appear in the sentences input from the corpus, into the class; and
   adding the searched nouns into a speech recognition dictionary DB.

3. The speech recognition method of claim 2, wherein said forming class searches the class, to which the each of the nouns belongs to, in the domain ontology DB and if the class is not defined in the domain ontology DB, the class is newly defined therein.

4. The speech recognition method of claim 2, wherein, in said adding the nouns, the searched nouns are added into the speech recognition dictionary DB through phoneme conversion.

5. The speech recognition method of claim 1, wherein said forming a speech recognition grammar includes:
   searching nouns in sentences input from a corpus;
   substituting each of the nouns into a class, to which the each of the nouns belongs, to describe the class in a speech recognition grammar;
   describing an attribute(s) of the each of the nouns in the speech recognition grammar;
   adding nouns having the attributes by searching them in the domain ontology DB into the class; and
   adding a verb into the speech recognition grammar, the verb having similar meaning to the verb present in a sentence of the each of the nouns.

6. The speech recognition method of claim 5, wherein, the attribute(s) is predicate and/or modifier presenting features of each of the noun.

7. The speech recognition method of claim 5, wherein the verb is added without losing its meaning by considering tense, aspect and mode thereof.

8. A speech recognition apparatus using a domain ontology, comprising:
   a domain ontology unit for constructing domain ontology DB;
   a grammar forming unit for forming a speech recognition grammar using the formed domain ontology DB so that the speech recognition grammar generates only sentences with viable meanings;
   an vector extracting unit, of a computer, for extracting a feature vector from a speech signal;
   a model unit for modeling the speech signal using an acoustic model;
   a speech recognizing unit for recognizing speech using the acoustic model and the speech recognition grammar on the basis of the feature vector
   an attribute adding unit for adding attribute(s) for each of nouns, in sentences input from a corpus, which are not defined in the class into the domain ontology DB, wherein the attribute(s) is a predicate and/or modifier presenting features of each of the nouns so that the domain ontology DB includes only sentences with viable meanings.

9. The speech recognition apparatus of claim 8, wherein the domain ontology unit includes:
    a noun search unit for searching nouns in sentences input from the corpus and;
    a class forming unit for forming a class to which each of the nouns searched by the noun search unit belongs in the domain ontology DB;
    an attribute defining unit for defining attributes of each of the nouns;
    a noun adding unit for adding nouns, which do not appear in the sentences input from the corpus, into the class; and
    a dictionary updating unit adding the searched nouns into a speech recognition dictionary DB.

10. The speech recognition apparatus of claim 9, wherein the class forming unit searches the class, to which the each of the nouns belongs to, in the domain ontology DB and if the class is not defined in the domain ontology DB, the class is newly defined therein.

11. The speech recognition apparatus of claim 9, wherein, the dictionary updating unit adds the searched nouns into the speech recognition dictionary DB through phoneme conversion.

12. The speech recognition apparatus of claim 8, wherein the grammar forming unit includes:
    a noun search unit for searching nouns in sentences input from a corpus;
    a noun substituting unit for substituting each of the nouns into a class, to which the each of the nouns belongs, to describe the class in a speech recognition grammar;
    an attribute describing unit for describing an attribute(s) of the each of the nouns in the speech recognition grammar;
    a noun adding unit for adding nouns having the attributes by searching in the domain ontology DB into the class; and
    a verb adding unit for adding a verb into the speech recognition grammar, the verb having similar meaning to the verb present in a sentence of the each of the nouns.

13. The speech recognition apparatus of claim 8, wherein, the attribute(s) is predicate and/or modifier presenting features of each of the noun.

14. The speech recognition apparatus of claim 8, wherein the verb is added without losing its meaning by considering tense, aspect and mode thereof.

* * * * *